(12) United States Patent
Singh et al.

(10) Patent No.: US 10,374,936 B2
(45) Date of Patent: Aug. 6, 2019

(54) REDUCING FALSE ALARMS WHEN USING NETWORK KEEP-ALIVE MESSAGES

(71) Applicant: Juniper Networks, Inc., Sunnyvale, CA (US)

(72) Inventors: Prashant Singh, Santa Clara, CA (US); Sairam Neelam, Hyderabad (IN)

(73) Assignee: Juniper Networks, Inc., Sunnyvale, CA (US)

( * ) Notice: Subject to any disclaimer, the term of this patent is extended or adjusted under 35 U.S.C. 154(b) by 386 days.

(21) Appl. No.: 14/984,926

(22) Filed: Dec. 30, 2015

(65) Prior Publication Data

US 2017/0195209 A1 Jul. 6, 2017

(51) Int. Cl.
| | |
|---|---|
| G06F 15/16 | (2006.01) |
| H04L 12/751 | (2013.01) |
| H04L 12/26 | (2006.01) |
| H04L 29/08 | (2006.01) |
| H04L 29/06 | (2006.01) |
| H04L 12/24 | (2006.01) |
| H04L 12/703 | (2013.01) |
| H04L 12/855 | (2013.01) |

(52) U.S. Cl.
CPC ........ *H04L 45/026* (2013.01); *H04L 41/5003* (2013.01); *H04L 43/10* (2013.01); *H04L 67/145* (2013.01); *H04L 67/322* (2013.01); *H04L 69/28* (2013.01); *H04L 45/28* (2013.01); *H04L 47/2466* (2013.01)

(58) Field of Classification Search
CPC .... H04L 45/026; H04L 41/5003; H04L 12/26
USPC .......................................... 709/223; 370/248
See application file for complete search history.

(56) References Cited

U.S. PATENT DOCUMENTS

| | | | |
|---|---|---|---|
| 5,253,248 A | 10/1993 | Dravida et al. | |
| 5,613,136 A | 3/1997 | Casavant et al. | |
| 5,721,855 A | 2/1998 | Hinton et al. | |
| 5,826,081 A | 10/1998 | Zolnowsky | |

(Continued)

FOREIGN PATENT DOCUMENTS

| | | |
|---|---|---|
| EP | 1367750 A1 | 12/2003 |
| EP | 1816801 A1 | 8/2007 |

(Continued)

OTHER PUBLICATIONS

Response to Examination Report dated Oct. 29, 2018, from counterpart European Application No. 16204540.5, filed Feb. 26, 2019 10 pp. (Year: 2018).*

(Continued)

*Primary Examiner* — David R Lazaro
*Assistant Examiner* — Mariegeorges A Henry
(74) *Attorney, Agent, or Firm* — Shumaker & Sieffert, P.A.

(57) ABSTRACT

Techniques are described to reduce false alarms in network devices utilizing keepalive messaging schemes. In order to potentially avoid false alarms, a transmitting network device adjusts quality of service QOS/TOS settings in keep-alive probe packets that are sent later in a current detection interval such that the keep-alive probe packets have escalating priorities. In addition, for keep-alive probe packets that are sent later in the current detection interval, the network device may also insert host-level preferential indicator within each of the packets to request preferential treatment at both itself and the peer network device.

16 Claims, 5 Drawing Sheets

(56) References Cited

U.S. PATENT DOCUMENTS

| | | |
|---|---|---|
| 5,848,128 A | 12/1998 | Frey |
| 5,933,601 A | 8/1999 | Fanshier et al. |
| 6,052,720 A | 4/2000 | Traversal et al. |
| 6,101,500 A | 8/2000 | Lau |
| 6,148,337 A | 11/2000 | Estberg et al. |
| 6,163,544 A | 12/2000 | Andersson et al. |
| 6,173,411 B1 | 1/2001 | Hirst et al. |
| 6,212,559 B1 | 4/2001 | Bixler et al. |
| 6,223,260 B1 | 4/2001 | Gujral et al. |
| 6,255,943 B1 | 7/2001 | Lewis et al. |
| 6,263,346 B1 | 7/2001 | Rodriquez |
| 6,272,537 B1 | 8/2001 | Kekic et al. |
| 6,304,546 B1 | 10/2001 | Natarajan et al. |
| 6,310,890 B1 | 10/2001 | Choi |
| 6,374,329 B1 | 4/2002 | McKinney et al. |
| 6,389,464 B1 | 5/2002 | Krishnamurthy et al. |
| 6,393,481 B1 | 5/2002 | Deo et al. |
| 6,405,289 B1 | 6/2002 | Arimilli et al. |
| 6,453,403 B1 | 9/2002 | Singh et al. |
| 6,453,430 B1 | 9/2002 | Singh et al. |
| 6,466,973 B2 | 10/2002 | Jaffe |
| 6,477,566 B1 | 11/2002 | Davis et al. |
| 6,477,572 B1 | 11/2002 | Elderton et al. |
| 6,480,955 B1 | 11/2002 | DeKoning et al. |
| 6,502,131 B1 | 12/2002 | Vaid et al. |
| 6,507,869 B1 | 1/2003 | Franke et al. |
| 6,510,164 B1 | 1/2003 | Ramaswamy et al. |
| 6,516,345 B1 | 2/2003 | Kracht |
| 6,529,941 B2 | 3/2003 | Haley et al. |
| 6,542,934 B1 | 4/2003 | Bader et al. |
| 6,563,800 B1 | 5/2003 | Salo et al. |
| 6,584,499 B1 | 6/2003 | Jantz et al. |
| 6,618,360 B1 | 9/2003 | Scoville et al. |
| 6,636,242 B2 | 10/2003 | Bowman-Amuah |
| 6,662,221 B1 | 12/2003 | Gonda et al. |
| 6,681,232 B1 | 1/2004 | Sistanizadeh et al. |
| 6,684,343 B1 | 1/2004 | Bouchier et al. |
| 6,725,317 B1 | 4/2004 | Bouchier et al. |
| 6,738,908 B1 | 5/2004 | Bonn et al. |
| 6,751,188 B1 | 6/2004 | Medved et al. |
| 6,757,897 B1 | 6/2004 | Shi et al. |
| 6,804,816 B1 | 10/2004 | Liu et al. |
| 6,816,897 B2 | 11/2004 | McGuire |
| 6,816,905 B1 | 11/2004 | Sheets et al. |
| 6,850,253 B1 | 2/2005 | Bazerman et al. |
| 6,910,148 B1 | 6/2005 | Ho et al. |
| 6,922,685 B2 | 7/2005 | Greene et al. |
| 6,934,745 B2 | 8/2005 | Krautkremer |
| 6,952,728 B1 | 10/2005 | Alles et al. |
| 6,982,953 B1 | 1/2006 | Swales |
| 6,983,317 B1 | 1/2006 | Bishop et al. |
| 6,990,517 B1 | 1/2006 | Bevan et al. |
| 7,024,450 B1 | 4/2006 | Deo et al. |
| 7,055,063 B2 | 5/2006 | Leymann et al. |
| 7,069,344 B2 | 6/2006 | Carolan et al. |
| 7,082,463 B1 | 7/2006 | Bradley et al. |
| 7,082,464 B2 | 7/2006 | Hasan et al. |
| 7,085,277 B1 | 8/2006 | Proulx et al. |
| 7,085,827 B2 | 8/2006 | Ishizaki et al. |
| 7,093,280 B2 | 8/2006 | Ke et al. |
| 7,099,912 B2 | 8/2006 | Ishizaki et al. |
| 7,103,647 B2 | 9/2006 | Aziz |
| 7,120,693 B2 | 10/2006 | Chang et al. |
| 7,124,289 B1 | 10/2006 | Suorsa |
| 7,130,304 B1 | 10/2006 | Aggarwal |
| 7,131,123 B2 | 10/2006 | Suorsa et al. |
| 7,139,263 B2 | 11/2006 | Miller et al. |
| 7,151,775 B1 | 12/2006 | Renwick et al. |
| 7,152,109 B2 | 12/2006 | Suorsa et al. |
| 7,161,946 B1 | 1/2007 | Jha |
| 7,184,437 B1 | 2/2007 | Cole et al. |
| 7,200,662 B2 | 4/2007 | Hasan et al. |
| 7,206,836 B2 | 4/2007 | Dinker et al. |
| 7,219,030 B2 | 5/2007 | Ohtani |
| 7,236,453 B2 | 6/2007 | Visser et al. |
| 7,305,492 B2 | 12/2007 | Bryers et al. |
| 7,310,314 B1 | 12/2007 | Katz et al. |
| 7,310,666 B2 | 12/2007 | Benfield et al. |
| 7,313,611 B1 | 12/2007 | Jacobs et al. |
| 7,336,615 B1 | 2/2008 | Pan et al. |
| 7,359,377 B1 | 4/2008 | Kompella et al. |
| 7,362,700 B2 | 4/2008 | Frick et al. |
| 7,363,353 B2 | 4/2008 | Ganesan et al. |
| 7,379,987 B2 | 5/2008 | Ishizaki et al. |
| 7,391,719 B2 | 6/2008 | Ellis et al. |
| 7,406,030 B1 | 7/2008 | Rijsman |
| 7,406,035 B2 | 7/2008 | Harvey et al. |
| 7,433,320 B2 | 10/2008 | Previdi et al. |
| 7,447,167 B2 | 11/2008 | Nadeau et al. |
| 7,463,591 B1 | 12/2008 | Kompella et al. |
| 7,471,638 B2 | 12/2008 | Torrey et al. |
| 7,487,232 B1 | 2/2009 | Matthews et al. |
| 7,499,395 B2 | 3/2009 | Rahman et al. |
| 7,506,194 B2 | 3/2009 | Appanna et al. |
| 7,508,772 B1 | 3/2009 | Ward et al. |
| 7,522,599 B1 | 4/2009 | Aggarwal et al. |
| 7,523,185 B1 | 4/2009 | Ng et al. |
| 7,539,769 B2 | 5/2009 | McGuire |
| 7,561,527 B1 | 7/2009 | Katz et al. |
| 7,606,898 B1 | 10/2009 | Hunt et al. |
| 7,609,637 B2 | 10/2009 | Doshi et al. |
| 7,639,624 B2 | 12/2009 | McGee et al. |
| 7,720,047 B1 | 5/2010 | Katz et al. |
| 7,720,061 B1 | 5/2010 | Krishnaswamy et al. |
| 7,724,677 B2 | 5/2010 | Iwami |
| 7,738,367 B1 | 6/2010 | Aggarwal et al. |
| 7,760,652 B2 | 7/2010 | Tsillas et al. |
| 7,764,599 B2 | 7/2010 | Doi et al. |
| 7,765,306 B2 | 7/2010 | Filsfills et al. |
| 7,765,328 B2 | 7/2010 | Bryers et al. |
| 7,813,267 B2 | 10/2010 | Tsai et al. |
| 7,852,778 B1 | 12/2010 | Kompella |
| 7,860,981 B1 | 12/2010 | Vinokour et al. |
| 7,911,938 B2 | 3/2011 | Florit et al. |
| 7,940,646 B1 | 5/2011 | Aggarwal et al. |
| 7,957,330 B1 | 6/2011 | Bahadur et al. |
| 7,990,888 B2 | 8/2011 | Nadeau et al. |
| 8,019,835 B2 | 9/2011 | Suorsa et al. |
| 8,077,726 B1 | 12/2011 | Kumar et al. |
| 8,189,579 B1 | 5/2012 | Krishnaswamy et al. |
| 8,254,271 B1 | 8/2012 | Nadeau et al. |
| 8,266,264 B2 | 9/2012 | Hasan et al. |
| 8,339,959 B1 | 12/2012 | Moisand et al. |
| 8,370,528 B2 | 2/2013 | Bryers et al. |
| 8,488,444 B2 | 7/2013 | Filsfils et al. |
| 8,503,293 B2 | 8/2013 | Raszuk |
| 8,543,718 B2 | 9/2013 | Rahman |
| 8,693,398 B1 | 4/2014 | Chaganti et al. |
| 8,797,886 B1 | 8/2014 | Kompella et al. |
| 8,902,780 B1 | 12/2014 | Hedge et al. |
| 8,948,001 B2 | 2/2015 | Guichard et al. |
| 8,953,460 B1 | 2/2015 | Addepalli et al. |
| 9,258,234 B1 | 2/2016 | Addepalli et al. |
| 9,455,894 B1 | 9/2016 | Neelam et al. |
| 2001/0042190 A1 | 11/2001 | Tremblay et al. |
| 2002/0007443 A1 | 1/2002 | Gharachorloo et al. |
| 2002/0032725 A1 | 3/2002 | Araujo et al. |
| 2002/0038339 A1 | 3/2002 | Xu |
| 2002/0093954 A1 | 7/2002 | Well et al. |
| 2002/0105972 A1 | 8/2002 | Richter et al. |
| 2002/0120488 A1 | 8/2002 | Bril et al. |
| 2002/0141343 A1 | 10/2002 | Bays |
| 2002/0158900 A1 | 10/2002 | Hsieh et al. |
| 2002/0165727 A1 | 11/2002 | Greene et al. |
| 2002/0169975 A1 | 11/2002 | Good |
| 2002/0191014 A1 | 12/2002 | Hsieh et al. |
| 2002/0194497 A1 | 12/2002 | Mcguire |
| 2002/0194584 A1 | 12/2002 | Suorsa et al. |
| 2003/0005090 A1 | 1/2003 | Sullivan et al. |
| 2003/0009552 A1 | 1/2003 | Benfield et al. |
| 2003/0055933 A1 | 3/2003 | Ishizaki et al. |
| 2003/0097428 A1 | 5/2003 | Afkhami et al. |
| 2003/0112749 A1 | 6/2003 | Hassink et al. |
| 2003/0123457 A1 | 7/2003 | Koppol |

(56) References Cited

U.S. PATENT DOCUMENTS

| | | | |
|---|---|---|---|
| 2003/0149746 | A1 | 8/2003 | Baldwin et al. |
| 2003/0152034 | A1* | 8/2003 | Zhang ............... H04L 29/12509 370/252 |
| 2004/0024869 | A1 | 2/2004 | Davies |
| 2004/0116070 | A1 | 6/2004 | Fishman et al. |
| 2005/0013310 | A1 | 1/2005 | Banker et al. |
| 2005/0021713 | A1 | 1/2005 | Dugan et al. |
| 2005/0063458 | A1 | 3/2005 | Miyake et al. |
| 2005/0083936 | A1 | 4/2005 | Ma |
| 2005/0175017 | A1 | 8/2005 | Christensen et al. |
| 2005/0195741 | A1 | 9/2005 | Doshi et al. |
| 2005/0259571 | A1 | 11/2005 | Battou |
| 2005/0259634 | A1 | 11/2005 | Ross |
| 2005/0281192 | A1 | 12/2005 | Nadeau et al. |
| 2006/0018266 | A1 | 1/2006 | Seo |
| 2006/0095538 | A1 | 5/2006 | Rehman et al. |
| 2006/0133300 | A1 | 6/2006 | Lee et al. |
| 2006/0233107 | A1 | 10/2006 | Croak et al. |
| 2006/0239201 | A1 | 10/2006 | Metzger et al. |
| 2006/0262772 | A1 | 11/2006 | Guichard et al. |
| 2006/0285500 | A1 | 12/2006 | Booth et al. |
| 2007/0014231 | A1 | 1/2007 | Sivakumar et al. |
| 2007/0021132 | A1 | 1/2007 | Jin et al. |
| 2007/0041554 | A1 | 2/2007 | Newman et al. |
| 2007/0061103 | A1 | 3/2007 | Patzschke et al. |
| 2007/0147281 | A1 | 6/2007 | Dale et al. |
| 2007/0165515 | A1 | 7/2007 | Vasseur |
| 2007/0180104 | A1 | 8/2007 | Filsfils et al. |
| 2007/0180105 | A1 | 8/2007 | Filsfils et al. |
| 2007/0207591 | A1 | 9/2007 | Rahman et al. |
| 2007/0220252 | A1 | 9/2007 | Sinko |
| 2007/0263836 | A1 | 11/2007 | Huang |
| 2007/0280102 | A1 | 12/2007 | Vasseur et al. |
| 2008/0004782 | A1 | 1/2008 | Kobayashi et al. |
| 2008/0034120 | A1 | 2/2008 | Oyadomari et al. |
| 2008/0049622 | A1 | 2/2008 | Previdi et al. |
| 2008/0074997 | A1 | 3/2008 | Bryant et al. |
| 2008/0163291 | A1 | 7/2008 | Fishman et al. |
| 2008/0225731 | A1 | 9/2008 | Mori et al. |
| 2008/0247324 | A1 | 10/2008 | Nadeau et al. |
| 2008/0253295 | A1 | 10/2008 | Yumoto et al. |
| 2009/0016213 | A1 | 1/2009 | Lichtwald |
| 2009/0019141 | A1 | 1/2009 | Bush et al. |
| 2009/0046579 | A1 | 2/2009 | Lu et al. |
| 2009/0046723 | A1 | 2/2009 | Rahman et al. |
| 2009/0201799 | A1 | 8/2009 | Lundstrom et al. |
| 2009/0201857 | A1* | 8/2009 | Daudin ............... H04W 60/02 370/328 |
| 2009/0225650 | A1 | 9/2009 | Vasseur |
| 2009/0232029 | A1 | 9/2009 | Abu-Hamdeh et al. |
| 2009/0279440 | A1* | 11/2009 | Wong ............... H04L 41/0631 370/242 |
| 2010/0208922 | A1* | 8/2010 | Erni ............... H04R 25/554 381/315 |
| 2010/0299319 | A1 | 11/2010 | Parson et al. |
| 2011/0019550 | A1 | 1/2011 | Bryers et al. |
| 2011/0063973 | A1 | 3/2011 | VenkataRaman et al. |
| 2011/0170408 | A1 | 7/2011 | Furbeck et al. |
| 2013/0028099 | A1 | 1/2013 | Birajdar et al. |
| 2013/0086144 | A1 | 4/2013 | Wu |
| 2013/0185767 | A1 | 7/2013 | Tirupachur Comerica et al. |
| 2014/0149819 | A1 | 5/2014 | Lu et al. |
| 2014/0321448 | A1* | 10/2014 | Backholm ............... H04L 43/10 370/338 |
| 2015/0063117 | A1* | 3/2015 | DiBurro ............... H04L 41/5025 370/236 |

FOREIGN PATENT DOCUMENTS

| | | |
|---|---|---|
| EP | 1861963 A2 | 12/2007 |
| EP | 1864449 A2 | 12/2007 |
| EP | 1891526 A2 | 2/2008 |
| EP | 1891526 B1 | 2/2012 |
| WO | 2006104604 A2 | 10/2006 |

OTHER PUBLICATIONS

"ActiveXperts Ping backgrounds (PING is part of the ActiveSocket Toolkit)," ActiveSocket Network Communication Toolkit 2.4, Activexperts, retrieved from www.activexperts.com/activsocket/toolkits/ping.html, Nov. 10, 2005, 3 pp.
"Configure an Unnumbered Interface," retrieved from www.juniper.net/tech,nubs/software/junos/junos56/index.html, Nov. 7, 2005, 1 p.
"Configure the loopback Interface," retrieved from www.juniper.net/techpubs/soft-ware/iunos/junos56/index.html, Nov. 7, 2005, 2 pp.
"ICMP (Internet Control Message Protocol)," Data Network Resource, www.rhyshaden.com/icmn.html, last printed Nov. 10, 2005, 4 pp.
Kessler et al., RFC 2151, "A Primer on Internet and TCP/IP Tools and Utilities," Chapter 3.4: Traceroute, Nov. 9, 2005, pp. 9-11.
"Traceroute," Webopedia, retrieved from www.webopedia.com/TERM/t/traceroute.html, Aug. 26, 2004, 1 p.
"Using the IP unnumbered configuration FAQ," APNIC, retrieved from www.apnic.net/info/faq/ip_unnumb.html, Jul. 1, 2005, 2 pp.
Aggarwal et al., "Bidirectional Forwarding Detection (BFD) for MPLS Label Switched Paths (LSPs)," Internet Engineering Task Force (IETF), RFC 5884, Cisco Systems, Inc., Jun. 2010, 12 pp.
Aggarwal, "OAM Mechanisms in MPLS Layer 2 Transport Networks," IEEE Communications Magazine, Oct. 2004, pp. 124-130.
Atlas, "ICMP Extensions for Unnumbered Interfaces," Internet Draft, draft-atlas-icmp-unnumbered-01, Feb. 2006, 8 pp.
Berkowitz, "Router Renumbering Guide," Network Working Group, RFC 2072, Jan. 1997, 41 pp.
Bonica et al., "Generic Tunnel Tracing Protocol (GTTP) Specification," draft-bonica-tunproto-01.txt, IETF Standard-Working-Draft, Internet Engineering Task Force, Jul. 2001, 20 pp.
Chen et al., "Dynamic Capability for BGP-4," Network Working Group, Internet Draft, draft-ietf-idr-dynamic-cap-03.txt, Dec. 2002, 6 pp.
Fairhurst, "Internet Control Message protocol," Internet Control Protocol, (ICMP), retrieved from www.erg.abdn.ac.uk/users/gorry/course/inet-pages/icmp.html, Sep. 6, 2006, 3 pp.
Chapter 1: BFD Configuration Commands, Command Manual—BFD-GR, H3C S361 O&S551 0 Series Ethernet Switches, Version: 20081229-C-1.01, Release 5303, 2006-2008, 13 pp.
Hegde et al., Multipoint BFD for MPLS, Network Working Group, Internet-Draft, draft-chandra-hedge-mpoint-bfd-for-mpls-00.txt, Mar. 5, 2012, 12 pp.
Kattz et al., "Biderectional Forwarding Detection (BFD) for Multihop Paths," Internet Engineering Task Force (IETF), RFC 5883, Jun. 2010, 6 pp.
Katz et al.,"Bidirectional Forwarding Detection (BFD) for IPv4 and IPv6 (Single Hop)," Internet Engineering Task Force (IETF), RFC 5881, Jun. 2010, 7 pp.
Katz et al., "Bidirectional Forwarding Detection (BFD)," Internet Engineering Task Force (IETF), RFC 5880, Jun. 2010, 49 pp.
Katz et al., "Generic Application of Bidirectional Forwarding Detection (BFD)," Internet Engineering Task Force (IETF), RFC 5882, Jun. 2010, 17 pp.
Kattz et al., "BFD for Multipoint Networks", Network Working Group, Internet Draft, draft-ietf-bfd-multipoint-00.txt, Oct. 18, 2011, 29 pp.
Kolon, "BFD spots router forwarding failures," Network World, retrieved from www.networkworld.com/news/tech/2005/030705techupdate.html, Mar. 7, 2005, 3 pp.
Kompella et al., "Detecting Multi-Protocol Label Switched (MPLS) Data Plane Failures," Network Working Group, RFC 4379, Feb. 2006, 50 pp.
Kompella et al., Signalling Unnumbered Links in Resource ReSerVation Protocol—Traffic Engineering (RSVP-TE), Network Working Group, RFC 3477, Jan. 2003, 8 pp.
Mannie, "Generalized Multi-Protocol Label Switching Architecture," Network Working Group, Internet draft, draft-ietf-ccamp-gmpls-architecture-07.txt, May 2003, 56 pp.

(56) References Cited

OTHER PUBLICATIONS

Nadeau et al., "Bidirectional Forwarding Detection (BFD) for the Pseudowire Virtual Circuit Connectivity Verification (VCCV)," Internet Engineering Task Force (IETF), RFC 5885, Jun. 2010, 14 pp.
Sangli et al., "Graceful Restart Mechanism for BGP," Network Working Group, Internet Draft, draft-ietf-idr-restart-06.txt, Jul. 2003, 10 pp.
Saxena et al., Detecting Data-Plane Failures in Point-to-Multipoint Mpls—Extensions to LSP Ping, Internet Engineering Task Force (IETF), RFC 6425, Nov. 2011, 28 pp.
Sun Hai-Feng, "Advanced TCP Port Scan and it's Response," O.L. Automation 2005, vol. 24, No. 4, China Academic Electronic Publishing House, Apr. 24, 2005, 2 pp. (English translation provided for abstract only).
Mukhi et al., "Internet Control Message Protocol ICMP," retrieved from www.vijaymukhi.com/vmis/icmp, Sep. 6, 2006, 5 pp.
Zvon, RFC 2072, [Router Renumbering Guide]—Router Identifiers, Chapter 8.3, Unnumbered Interfaces, Nov. 7, 2005, 2 pp.
Boney, "Cisco IOS in a Nutshell, 2nd Edition", O'Reilly Media, Inc., Aug. 2005, 16 pp.
Harmon, "32-Bit Bus Master Ethernet Interface for the 68030 (Using the Macintosh SE/30)," National Semiconductor Corporation, Apr. 1993, 10 pp.
Muller, "Managing Service Level Agreements," International Journal of Network Management, John Wiley & Sons, Ltd., May 1999, vol. 9, Issue 3, pp. 155-166.
Papavassiliou, "Network and service management for wide-area electronic commerce networks," International Journal of Network Management, John Wiley & Sons, Ltd., Mar. 2001, vol. 11, Issue 2, pp. 75-90.
Ramakrishnan et al.,"The Addition of Explicit Congestion Notification (ECN) to IP", RFC 3168, Network Working Group, Sep. 2001, 63 pp.
Schmidt, "A Family of Design Patterns for Flexibly Configuring Network Services in Distributed Systems," Proceedings of the Third International Conference on Configurable Distributed Systems, May 6-8, 1996, IEEE Press, pp. 124-135.
Troutman, "DP83916EB-AT: High Performance AT Compatible Bus Master Ethernet Adapter Card," National Semiconductor Corporation, Nov. 1992, 34 pp.
Mukhi et al., "Internet Control Message Protocol ICMP," www.vijaymukhi.com/vmis/icmp, last printed Sep. 6, 2006, 5pp.
Extended Search Report from counterpart European Application No. 16204540.5, dated Apr. 21, 2017, 5 pp.
U.S. Appl. No. 15/018,669, by Juniper Networks, Inc. (Inventors: Addepalli et al.), filed Feb. 8, 2016.
U.S. Appl. No. 15/198,756, by Juniper Networks, Inc. (Inventors: Seth et al.), filed Jun. 30, 2016.
"DARPA Internet Program Protocol Specification," Transmission Control Protocol, RFC 793, Sep. 1981, 90 pp.
Nichols, et al., "Definition of the Differentiated Services Field (DS Field) in the IPv4 and IPv6 Headers," Network Working Group, RFC 2474, Dec. 1998, 19 pp.
Examination Report from counterpart European Application No. 16204540.5, dated Feb. 8, 2018, 9 pp.
Response to Examination Report dated Feb. 8, 2018, from counterpart European Application No. 16204540.5, filed Jun. 5, 2018, 23 pp.
Examination Report from counterpart European Application No. 16204540.5, dated Oct. 29, 2018, 5 pp.
Response to Extended Search Report dated Apr. 21, 2017, from counterpart European Application No. 16204540.5, filed Jan. 4, 2018, 1 pp.

\* cited by examiner

REDUCING FALSE ALARMS WHEN USING NETWORK KEEP-ALIVE MESSAGES

TECHNICAL FIELD

This disclosure relates generally to computer networks, and more specifically, to periodic communications, such as communications used for liveliness detection, between devices in a computer network.

BACKGROUND

Applications executing within a network environment frequently utilize "keep alive" messaging schemes to monitor operational status of other applications within the network. For example, applications executing on network devices within network environment send periodic packets to each to confirm connectivity and to indicate operational status of each device. These periodic packets are sometimes referred to as "keepalives" or "hellos." For example, a first application executing on one network device may send periodic packets to a peer application executing on another network device every 50 milliseconds (ms) to indicate that the first application is still operational. Likewise, the application may detect reception of corresponding periodic packets from the peer application within the same period of time (e.g., 50 ms). When a threshold number of packets have not been received in the allotted time frame, the application determines that a session failure event has occurred, such as failure of the network device on which the peer application is executing, failure of a link or node connecting the two network devices or failure of the application itself. In response to the failure, the network device on which the peer application is executing may take certain actions, such as redirecting communications to a different peer application.

As one example, routers may exchange periodic packets by establishing a session provided by the bidirectional forwarding detection (BFD) protocol. In accordance with BFD, a first router periodically sends BFD packets at a negotiated transmission time interval and detects a session failure event when the router does not receive a BFD packet from a second router within session detection time interval. For instance, a router may negotiate to receive BFD packets every 50 ms from a peer router and may independently utilize a detection multiplier of three (3) times that interval, i.e., 150 ms in this example, for detecting failure. If the receiving router does not receive a BFD packet from the peer router within the 150 ms session detection time interval, the receiving router detects a connectivity failure with respect to the second router. Consequently, the receiving router may update its routing information to route traffic around the second router. Further details of the BFD protocol may be found in the proposed standard for BFD, by D. Katz and D. Ward (Juniper Networks, June 2010, ISSN: 2070-1721), the entire content of which is incorporated herein by reference.

SUMMARY

In general, techniques of this disclosure are directed to reducing false alarms in network devices utilizing keep-alive messaging schemes. As described herein, in order to potentially avoid false alarms, a transmitting network device may adjust quality of service (QOS)/type of service (TOS) settings in keep-alive probe packets for a communication session that are sent later in a detection interval for the communication session such that the keep-alive probe packets have escalating priorities. That is, when transmitting keep-alive probe packets for a given communication session, the network device monitors whether a response communication (e.g., keep-alive response packets or asynchronous keep-alive probe packets) has been received from the peer device within the current detection interval and sets the QOS/TOS settings within headers of the keep-alive probe packets accordingly. As such, keep-alive probe packets sent by network device at a time later in the detection interval receive increased QOS/TOS priority and, therefore, receive preferential treatment by intermediate network elements.

In addition, for keep-alive probe packets that are sent later in the detection interval, the network device may also insert host-level preferential indicator within each of the packets to request preferential treatment at both itself and the peer network device. For example, the host-level preferential indicator may indicate that the corresponding keep-alive probe packet is the last to be sent prior to expiration of the detection interval. Hardware/software of the network devices that handle packet transmissions, such as operating system (kernel) software including network stack software, interface drivers, network interface hardware, such as a network interface card (NIC), provide preferential treatment when servicing the transmission or reception of keep-alive probe packets and response packets.

Moreover, the peer network device may generate response communications so as to inherit the QOS/TOS settings and any host-level preferential indicator of the most recently received keep-alive probe packet.

In one example, a method includes maintaining, with a network device, a keep-alive transmit timer and a keep-alive detection timer associated with a communication session with a peer network device within a network. The keep-alive transmit timer defines a transmit time interval for transmitting keep-alive probe packets for the communication session and the keep-alive detection timer defines a current detection interval within which a response communication (e.g., keep-alive response messages or asynchronous keep-alive probe messages) from the peer network device must be received to avoid a failure event for the communication session. The method further includes responsive to expiration of the keep-alive transit timer during the current detection interval, outputting, by the network device, a first keep-alive probe packet associated with the communication session with the peer network device, wherein the keep-alive probe packet includes quality of service (QoS) settings that controls forwarding priority of the keep-alive probe packet by packet-switching devices within the network, and wherein the QoS settings have a value indicating a first priority level. The method further includes, responsive to a second expiration of the keep-alive transit timer associated during the current detection interval, determining whether a communication has been received from the peer network device since output of the first keep-alive probe packet and, when the communication has not been received, outputting a second keep-alive probe packet associated with the communication session, wherein the second keep-alive probe packet includes QoS settings having a value indicating a second priority level increased from the first priority level.

In another example, a method includes receiving, by a network device, a keep-alive probe packet associated with a communication session with a peer network device within a network, wherein the keep-alive probe packet includes quality of service (QoS) settings that controls forwarding priority of the keep-alive probe packet by packet-switching devices within the network. The method further includes constructing, with the network device, a keep-alive response packet, copying the QoS settings of the keep-alive probe packet to QoS settings within the keep-alive response packet, and outputting the keep-alive response packet from the network device to the peer network device.

In another example, a network device includes a memory, programmable processor(s), a network interface, and a control unit. The control unit is configured to perform the operations described herein.

In another example, a computer-readable storage medium is encoded with instructions. The instructions cause one or more programmable processors of a network device to perform the operations described herein.

The details of one or more examples are set forth in the accompanying drawings and the description below. Other features, objects, and advantages of this disclosure will be apparent from the description and drawings, and from the claims.

DETAILED DESCRIPTION

Figure 1:
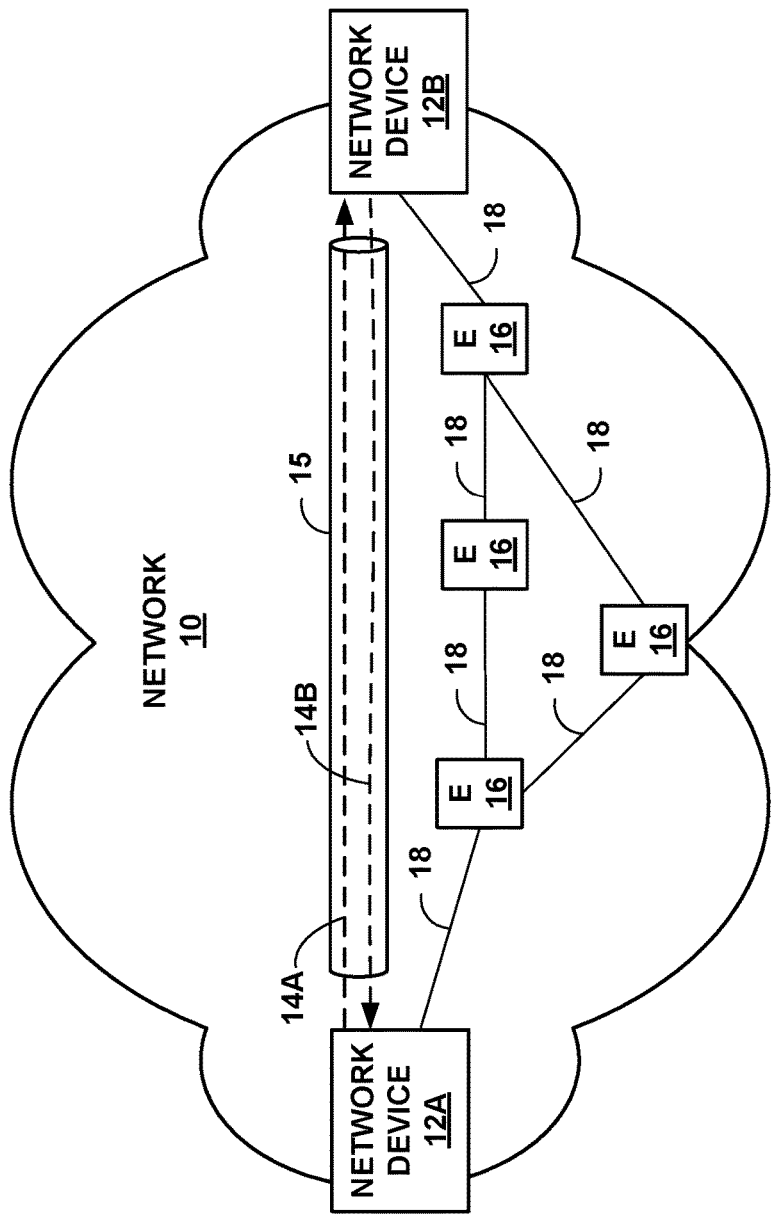
FIG. 1 is a block diagram illustrating an example network system in which techniques described herein may be implemented.

FIG. 1 is a block diagram illustrating an example network system 10 in which techniques described herein may be implemented. In this example, network system 10 includes network devices 12A, 12B ("network devices 12"), which operate and interact with one another in accordance with the techniques described herein. Network devices 12 are communicatively coupled to one another, either directly, or indirectly, via one or more intermediate network elements ("E") interconnected by physical links 18. Network elements 16 may, for example, be routers, switches, gateways, firewalls and the like. Links 18 represent any physical medium, such as a copper wire, a coaxial cable, any of a host of different fiber optic lines, a wireless connection, and various combinations thereof.

In general, network devices 12 execute applications that periodically send status messages (e.g., send "periodic packets" or "keep-alive packets") to one another in order to indicate monitor operational and connectivity status of each other. That is, by sending periodic inquiries and detecting receipt of similar periodic inquiries, network devices 12 detect any failures, either as a result of failure of one or more of network devices 12, network elements 16 or of links 18 between them. Upon detecting such a failure, the detecting network device 12 takes certain actions, such as redirecting communications to a different peer application. Network devices 12 may be end-user computers, desktops, laptops, mobile devices, servers, virtual machines or networking infrastructure, such as routers, switches, gateways, firewalls, or other network-enabled devices.

In the example of FIG. 1, an application executing on network device 12A establishes a communication session 15, such as a Transmission Control Protocol (TCP) session, with network 12B and transmits keep-alive probe packets 14A to network device 12B over the communication session. When transmitted, keep-alive probe packets 14A are first processed by transmit hardware/software on network device 12A (e.g., kernel software including network stack software, interface drivers and network interface hardware), processed by hardware/software of intermediate network elements 16 (e.g., packet forwarding ASICs, switch fabrics, packet queues of the network elements) when transporting the packets, and ultimately processed by receive hardware/software of network device 12B.

In response, network device 12B transmits keep-alive response packets 14B on communication session 15. That is, upon receiving a keep-alive probe packet 14A, network device 12B constructs a respective keep-alive response packet 14B and outputs the response packet to network device 12A over the communication session. Keep-alive response packet 14B are, therefore, processed by transmit hardware/software on network device 12B when transmitting the packet, processed by hardware/software of network elements 16 (e.g., packet forwarding ASICs, switch fabrics, packet queues) when transporting the packets and ultimately processed by receive hardware/software of network device 12A.

In operation, network device 12A implements a transmission (or "transmit") timer that controls transmission of keep-alive probe packets 14A over the communication session. That is, the transmit timer measures intervals for network device 12A to transmit a keep-alive probe packet 14A over the communication session, and triggers transmission of the packet upon reaching the negotiated interval.

Network device 12A implements a detection timer to monitor receipt of keep-alive response packets 14B. The detection timer measures intervals between received keep-alive probe packets 14B over the communication session. Using the detection timer, network device 12A determines the operational status of network device 12B, i.e., whether network device 12A is operational and in communication. For instance, if network device 12A does not receive a keep-alive response packet 14B within the session detection time, the network device determines that a network event has occurred that is preventing communication, such as a failure of an intermediate link 18 or network element 16 or failure of hardware and/or software of network device 12B. In many instances, network device 12A sets the detection timer to a multiple (e.g., an integer multiple) of the negotiated transmit interval, such as a value of 3*Transmit_Interval. For example, if the transmit interval is being used by network device 12A is 50 ms, network device 12A may determine a failure has occurred if no keep-alive response packet 14B is received in 150 ms, i.e., three (3) transmit intervals.

In some situations, the detection timer of network device 12A may expire even though network device 12B has not failed and communication connectivity still exists between the devices. For example, network congestion, i.e., heavy traffic loads leading to length packet queues, within intermediate network elements 16 may cause communication delays that exceed the detection interval maintained by network device 12A. During this period, network device 12A will typically have sent multiple keep-alive probe packets 14A, one for each respective transmit interval. Each of the successive keep-alive probe packets 14A sent by network device 12A during the detection interval traverses intermediate elements 16 and links 18 and may be subject to the same congestion and network delays, thereby giving rise to a network event upon expiration of the detection interval at network device 12B.

As described herein, in order to potentially avoid false alarms, network device 12A may adjust quality of service (QOS)/type of service (TOS) settings in keep-alive probe packets 14A that are sent later in the detection interval so as to have escalating priorities. That is, when transmitting keep-alive probe packets 14A, network device 12A monitors whether keep-alive response packets 14B have been received and sets the QOS/TOS settings within the header of the keep-alive probe packets 14A accordingly. For example, network device 12A may utilize an increased QOS/TOS setting in an outbound keep-alive probe packet 14A when an expected keep-alive response packet 14B has not been received within a current detection interval. Moreover, network device 12A may utilize a further increased QOS/TOS setting when transmitting subsequent keep-alive probe packets 14A when a keep-alive response packet 14B still has not been received within the detection interval. As such, keep-alive probe packets 14A sent by network device 12A at a time later in the detection interval of network device 12B receive increased QOS/TOS priority and, therefore, receive preferential treatment by intermediate network elements 16 and by queuing and processing operations of network devices 12A, 12B.

In addition, for keep-alive probe packets 14A that are sent later in the detection interval, network device 12A may insert host-level preferential indicator within each of the packets to request preferential treatment by network devices 12A, 12B. For example, network device 12A may include the host-level preferential indicator within the final keep-alive probe packet 14A to be transmitted before expiration of the detection interval of network device 12B. Keep-alive probe packets 14A containing the host-level preferential indicator are serviced with a higher priority by both the transmission hardware/software of network device 12A and the receive hardware/software of network device 12B. Example hardware/software of network devices 12A, 12B that typically handle packet transmissions include operating system (kernel) software including network stack software, interface drivers, network interface hardware, such as a network interface card (NIC). The hardware/software on network devices 12A, 12B may service the transmission or reception of keep-alive probe packets 14A having the host-level preferential indicator on an interrupt-driven basis rather than a thread polling scheme that would otherwise be used for keep-alive probe packets 14A that do not include the preferential indicator. As another example, hardware/software of network devices 12A, 12B may maintain separate transmit and receive queues for keep-alive probe packets 14A that contain the preferential indicator, thereby bypassing queues used for packets that do not contain the host-level preferential indicator.

In this way, the techniques described herein may help ensure timely delivery of keep-alive probe packets 14A when expiration of the detection interval maintained by network device 12A is approaching, thereby increasing the likelihood of the keep-alive probe packets reaching network device 12B and avoiding false alarms due to network congestion within network elements 16 or network devices 12A, 12B themselves.

Moreover, in some example implementations, network device 12B generates keep-alive response packets 14B so as to inherit the QOS/TOS settings and any host-level preferential indicator of the most recently received keep-alive probe packet 14A. That is, when constructing keep-alive response packets 14B, network device 12B may set the QOS/TOS settings within the packet header to be the same as the QOS/TOS settings within the packet header of the most-recently received keep-alive probe packet 14A. Moreover, network device 12B may also set the host-level preferential indicator within keep-alive response packets 14B to be the same as the host-level preferential indicator of the most-recently received keep-alive probe packet 14A. As such, in the event a keep-alive probe packet 14A is received having escalated priority and host-level preferential indicator, thereby receiving priorities processing and avoiding network congestion within intermediate network elements 16 and/or network devices 12A, the keep-alive response packet 14B sent in response thereto will automatically have the same escalated priorities and host-level preferential indicator. Thus, in this example implementation, the keep-alive response packet 14B will similarly have an increased likelihood of avoiding network congestion within intermediate network elements 16 and/or network devices 12A so as to be received and processed by network device 12A within the expected time frame. In other words, receipt of a keep-alive probe packet 14A having escalated priority and host-level preferential indicator provides an indication to network device 12B that network device 12A is operational but is not receiving keep-alive response packets 14B and, therefore, network device 12A has escalated the priorities and host-level preferential indicator in an effort to avoid false alarm triggering of a failure of the keep-alive messaging scheme. As such, network device 12B mirrors the priorities and host-level preferential indicator into keep-alive response packets 14B when generating the keep-alive response packets to further assist avoidance of triggering false alarms.

In one example implementation, applications executing on network devices 12A, 12B may configure the Differentiated Services Field (DS Field) in the IPv4 and IPv6 headers of the keep-alive probe packets 14A and keep-alive response packets 14B to set desired QOS/TOS priories for packets. Further example details of the differentiated services field in IP are described in RFC 2474, *Definition of the Differentiated Services Field (DS Field) in the IPv4 and IPv6 Headers*, December 1998, the entire contents of which are incorporated herein by reference.

Moreover, when utilizing TCP/IP-based communication sessions, the applications of network devices 12A, 12B may utilize one or more of the Reserved bits or the "Urgent" (URG) bit of the TCP header to carry the host-level preferential indicator. As another example implementation, when utilizing BFD communication sessions, network devices 12A, 12B may utilize one or more of the Diagnostic (DIAG) bit of the BFD header to carry the host-level preferential indicator. As another example, applications may utilize the Options field within the IP header to carry the host-level preferential indicatory.

Figure 2:
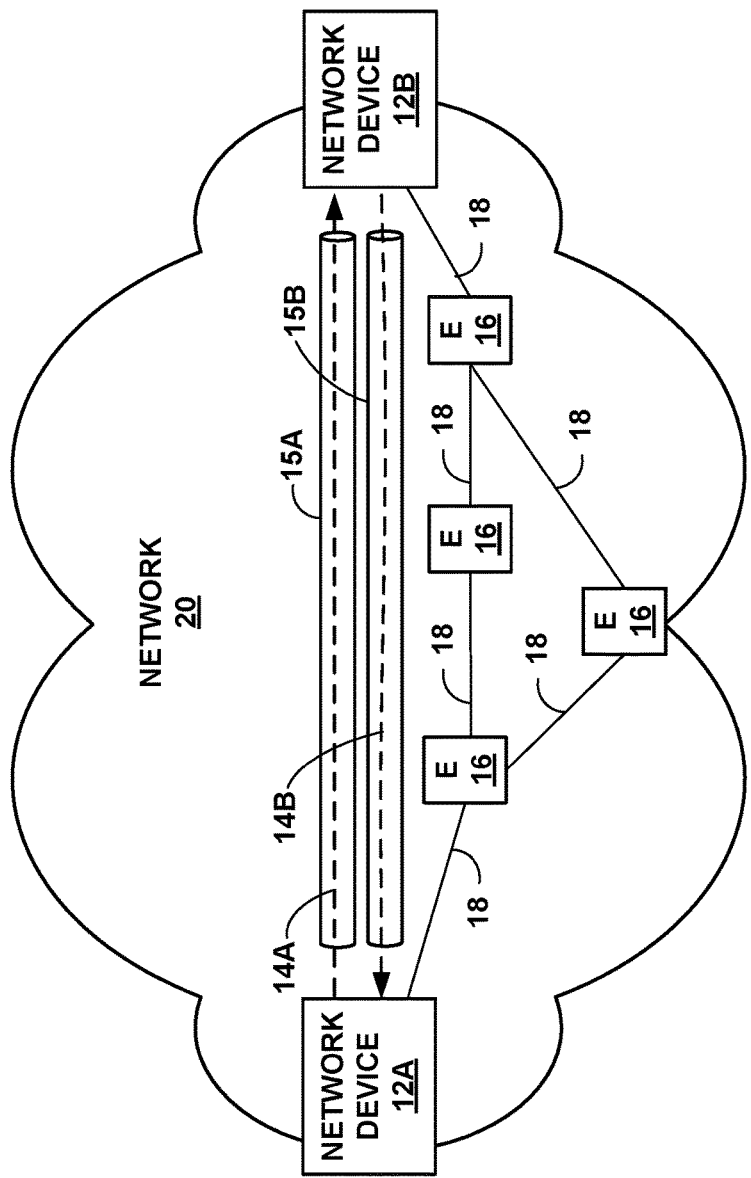
FIG. 2 is a block diagram illustrating another example network system implementing the techniques described herein.

FIG. 2 is a block diagram illustrating another example in which network devices 12A, 12B exchange keep-alive packets with one another. In the example described above with respect to FIG. 1, network device 12A, 12B are implementing an acknowledgement-based communication scheme in which network device 12A transmits keep-alive probe packets 14A and network device 12B responds with a response communication, e.g., keep-alive response packets 14B. In the example implementation of FIG. 2, network devices 12A, 12B each output a so-called "heart beat" of keep-alive probe packets over one or more communication sessions 15A, 15B. That is, in this example, network device 12A transmits keep-alive probe packets 14A at a certain transmit interval while network device 12B similarly outputs keep-alive probe packets 14B at a certain transmit interval. As described above, each network device 12A, 12B monitors whether keep-alive probe packets have been received from the other device within a current detection interval, and when generating and transmitting its respective keep-alive probe packets, sets the QOS/TOS settings within the header of the keep-alive probe packet accordingly. For example, network device 12A may utilize an increased QOS/TOS setting when a keep-alive probe packet 14B has not been received within a detection interval maintained by network device 12A. Similarly, network device 12B may utilize an increased QOS/TOS setting for keep-alive probe packet 14B when a keep-alive probe packet 14A has not been received within a current detection interval maintained by network device 12B. In addition, network devices 12A, 12B may insert host-level preferential indicator when transmitting for keep-alive probe packets 14A, 14B, respectively, to request preferential treatment by network devices 12A, 12B.

As described, keep-alive probe packets 14A, 14B having increase QOS/TOS priority receive preferential treatment by intermediate network elements 16, and such packets having host-level preferential indicator are further prioritized and efficiently processed by network devices 12A, 12B. In this way, the techniques described herein may help ensure timely delivery of keep-alive probe packets 14A, 14B so as to avoid false alarms due to network congestion within network elements 16 or network devices 12A, 12B themselves.

Moreover, in some examples, both network devices 12A, 12B generates keep-alive probe packets 14A, 14B so as to inherit the QOS/TOS settings and any host-level preferential indicator of the keep-alive probe packet most recently received from the other network device. That is, upon receiving an incoming keep-alive probe packet having increased QOS/TOS settings and host-level preferential indicator, the receiving one of the network devices 12 copies the settings in the next keep-alive probe packet that it transmits. For example, receipt of a keep-alive probe packet 14A having escalated priority and host-level preferential indicator provides an indication to the receiving network device 12B that network device 12A is operational but is not receiving keep-alive probe packets 14B from network device 12B and that, in response, network device 12A has escalated the priorities and host-level preferential indicator in an effort to avoid false alarm triggering of a failure of the keep-alive messaging scheme. As such, network device 12B mirrors the priorities and host-level preferential indicator into keep-alive probe packets 14B when generating the keep-alive probe packets to further assist avoidance of triggering false alarms.

The techniques described above with respect to FIGS. 1 and 2, may be applied to a variety of network protocols that utilizes periodic messages for indicating operational and connectivity status to a peer device. One exemplary protocol is referred to as the bidirectional forwarding detection (BFD) protocol, which is commonly used between two network devices in order for each router to closely monitor the state (e.g., health) of the other device. For example, network devices 12 may establish a BFD session for sending and responding to status inquiries in the form of Hello packets, either asynchronously or when needed (e.g., as in the BFD Demand Mode). In either case, the BFD protocol provides a very short interval of time between which network devices 12 must transmit periodic messages, and thus may facilitate the quicker detection of failures by network devices 12 that are in an active BFD session. Further example details of the BFD protocol are described in D.

Katz, D. Ward, Bidirectional Forwarding Detection, June 2010, the entire contents being incorporated herein by reference.

Figure 3:
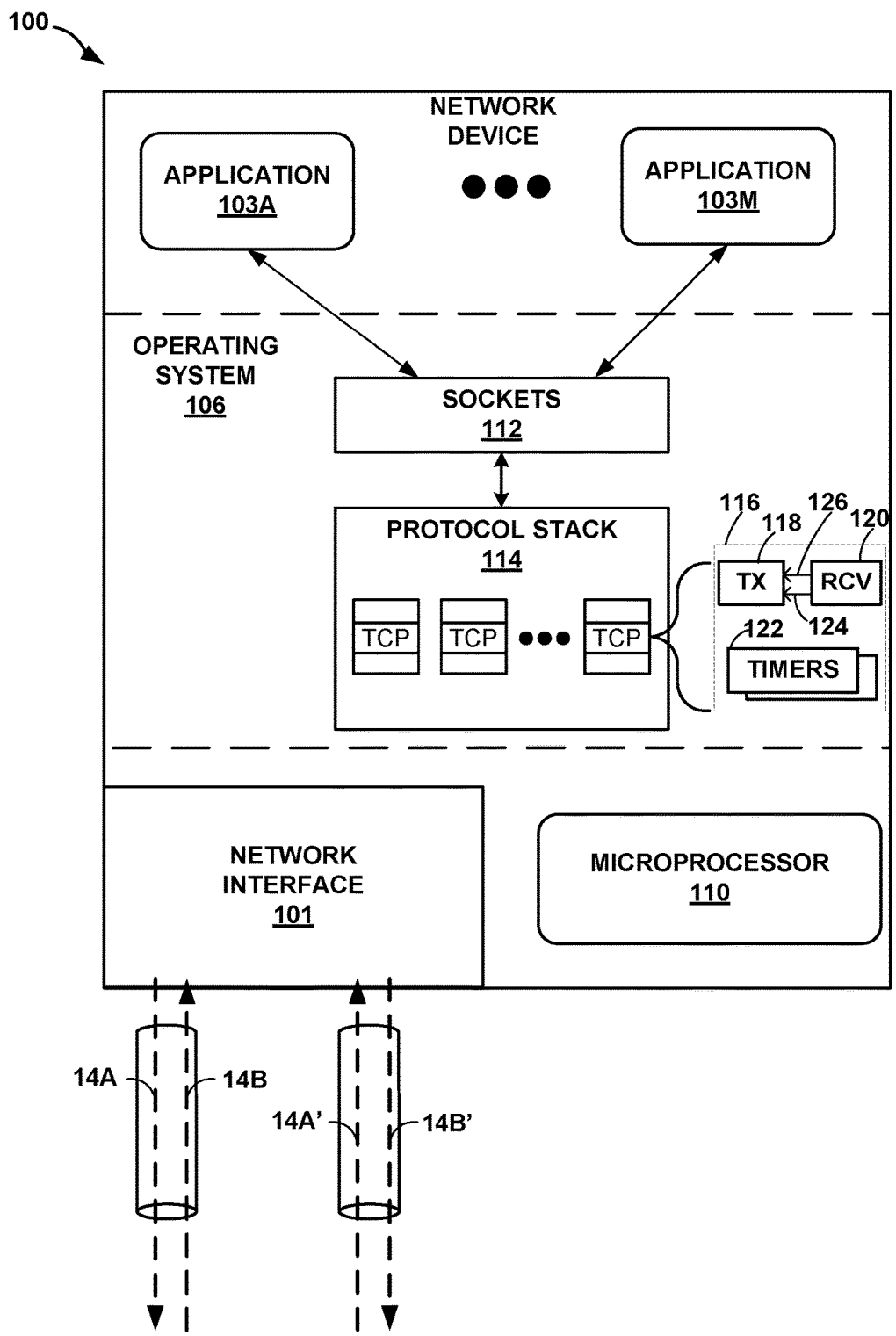
FIG. 3 is a block diagram illustrating an exemplary network device in accordance with the disclosure herein.

FIG. 3 is a block diagram illustrating an example network device 100 that provides an operating environment for one or more applications 103A-103M ("applications 103"). For example, network device 100 may represent any of network devices 12A, 12B of FIGS. 1, 2.

In this example, network device 100 includes a network interface 101 to send and receive network packets. In addition, network device 100 includes a microprocessor 110 executing operating system 106 to provide an execution environment for one or more applications 103 that communicate with other network devices over a packet-based network. In general, applications 103 represent any component of a network device that utilizes keep-alive messages to communicate with other network device. As discussed herein, in example implementations, network device may be an endpoint network device, e.g., a user computing device, backend server or virtual machine executing in the "cloud." Example user-related applications include email applications, video conferencing applications, peer computing applications, and the like. As additional examples, network device 100 may provide network operations, such as a router, switch, firewall, Intrusion detection system, network cache, DNS server. Example applications 103 include routing protocols, device management applications, such as BFD, SNMP or NETCONF, or the like.

In the example of FIG. 3, operating system 106 executing within network device 100 implements kernel-level processes for handling data at various layers of the open systems interconnection (OSI) networking model (shown as protocol stack 114). Operating system 106 provides an API by which applications 103 creates sockets 112 and establishes, for example, TCP/IP-based communication sessions for sending and receiving routing messages for each socket. Details of the OSI model are described in ISO 7498, 2nd Information technology—Open Systems Interconnection—Basic Reference Model: The Basic Model, (1994), incorporated herein by reference. Further details of TCP are described in RFC 793, *TRANSMISSION CONTROL PROTOCOL*, Internet Engineering Task Force (IETF), September 1981, the entire contents of which are incorporated herein by reference.

Sockets 112 are logical constructs having data structures and state data maintained by operating system 106 and may be viewed as acting as interfaces between applications 103 and protocol stack 114. For instance, sockets 112 may include one or more data structures that define data relating to one or communication sessions, such as a file descriptor of a socket, a thread identifier of the socket, an active/backup state of the socket, and a pointer to a TCP socket within protocol stack 114. Sockets are used herein as one common mechanism for establishing communication sessions between devices and the techniques described herein may be applied to any other type of communication session that utilizes which session maintenance messages.

In the example, TCP implementation of protocol stack 114 includes a keep alive manager 116 that provides keep-alive functionality for each socket 112 instantiated by applications 103. For example, for each socket, keep alive manager 116 creates timers 122, such as a transmit timer and a detection timer, for triggering transmission of keep alive probe messages and keep alive response messages, respectively, for the corresponding socket, i.e., for each communication session established by applications 103. Keep-alive transmit controller ("TX") 118 and keep-alive receive controller ("RCV") 120 operate responsive to transmit and detection timers 122, respectively, in accordance with the techniques described herein.

For example, keep-alive receive controller 120 produces message 124 to inform keep-alive transmit controller 118 when a keep-alive response message is received for a given communication session. When constructing and transmitting keep-alive probe packets 14A, keep-alive transmit controller 118 sets the QOS/TOS settings within the header of the packets based on when a most-recent keep-alive response packets 14B was received within a current detection interval. For example, keep-alive transmit controller 118 may utilize an increased QOS/TOS setting when constructing a current keep-alive probe packet 14A if a keep-alive response packet 14B has not been received since transmission of the prior keep-alive probe packet 14A within the current detection interval. Moreover, keep-alive transmit controller 118 may utilize a further increased QOS/TOS setting when transmitting subsequent keep-alive probe packets 14A in the event a keep-alive response packet 14B still has not been received at a time later in that same detection interval. As such, keep-alive probe packets 14A sent by keep-alive transmit controller 118 at a time later in the detection interval for the respective socket 112 receive increased QOS/TOS priority and, therefore, receive preferential treatment by intermediate network elements. In addition, for keep-alive probe packets 14A that are sent later in the detection interval, keep-alive transmit controller 118 may insert host-level preferential indicator within each of the packets to request preferential treatment by endpoint network devices. In this way, the techniques described herein may help ensure timely delivery of keep-alive probe packets 14A when expiration of the detection interval is approaching, thereby avoiding false alarms due to network congestion within network elements 16 or network devices 12A, 12B themselves.

As one example, keep-alive transmit controller 118 may operate generally as shown in Table 1. In this example, keep-alive receive controller 120 is configured with a detection interval of five (5) times the transmit interval and, in the event keep-alive response packets 14B are not received from a peer network device, constructs keep-alive probe packets throughout the detection interval as shown in Table 1.

TABLE 1

| KEEP ALIVE PROBE PACKET SEQUENCE # | PRIORITY BITS | HOST-LEVEL PREFERENTIAL INDICATOR |
|---|---|---|
| 1 | LOW | NO |
| 2 | LOW | NO |
| 3 | MED | NO |
| 4 | MED | YES |
| 5 | HIGH | YES |

In this example, keep-alive transmit controller 118 constructs the first and second keep-alive probe packets 14A within a current detection interval for the communication session as a conventional keep-alive probe packet 14A, i.e., without any TOS/QOS settings and without requesting any host-level preferential indicator. In the event a keep-alive response packet 14B has not been received by the time keep-alive transmit controller 118 is to transmit the third keep-alive probe packet 14A within the same detection interval, keep-alive transmit controller 118 constructs the third keep alive probe packet 14A within the detection interval to have increased priority bits, e.g., set to a MEDIUM priority level, but does not at this time include a host-level preferential indicator within the keep-alive probe packet. In the event a keep-alive response packet 14B has still not been received by keep-alive receive controller 120 when time keep-alive transmit controller 118 is triggered to transmit the fourth keep-alive probe packet 14A within the same detection interval, the keep-alive transmit controller 118 constructs the fourth keep alive probe packet 14A to have increased priority bits, e.g., set to a MEDIUM priority level as well as having a host-level preferential indicator. Finally, in this example, if a keep-alive response packet 14B has not been received by keep-alive receive controller 120 when keep-alive transmit controller 118 is triggered to transmit the fifth keep-alive probe packet 14A, the keep-alive transmit controller constructs the fifth keep alive probe packet 14A within the detection interval to have increased priority bits of HIGH priority level and to include a host-level preferential indicator.

In addition, keep-alive transmit controller 118 and keep-alive receive controller 120 of network device 100 operate to respond to keep-alive messages from other device for a given communication session. For example, keep-alive receive controller 120 may receive inbound keep alive probe message 14A'. Responsive to those inbound keep-alive probe message 14A', keep-alive receive controller 120 outputs message 126 directing transmit controller 118 to construct and output a keep-alive response message 14B'. When generating message 126, keep alive receive controller 120 includes and priority settings (e.g., QOS/TOS bits) and any host-level preferential indicator that were present within inbound keep-alive probe message 14A', thereby communicating this information to keep alive transmit controller 118. In response, keep alive transmit controller 118 generates keep-alive response packets 14B' so as to inherit the QOS/TOS settings and any host-level preferential indicator of the most recently received keep-alive probe packet 14A'. That is, when constructing keep-alive response packets 14B', keep alive transmit controller 118 set the QOS/TOS settings and host-level preferential indicator within the packet header to be the same as (i.e., copies) the QOS/TOS settings and host-level preferential indicator within the packet header of the most-recently received keep-alive probe packet 14A', as specified by message 126. As such, in the event a keep-alive probe packet 14A' is received having escalated priority and host-level preferential indicator, thereby receiving priorities processing and avoiding network congestion within intermediate network elements and/or host network devices, the keep-alive response packets 14B' sent in response thereto will automatically have the same escalated priorities and host-level preferential indicator.

Figure 4:
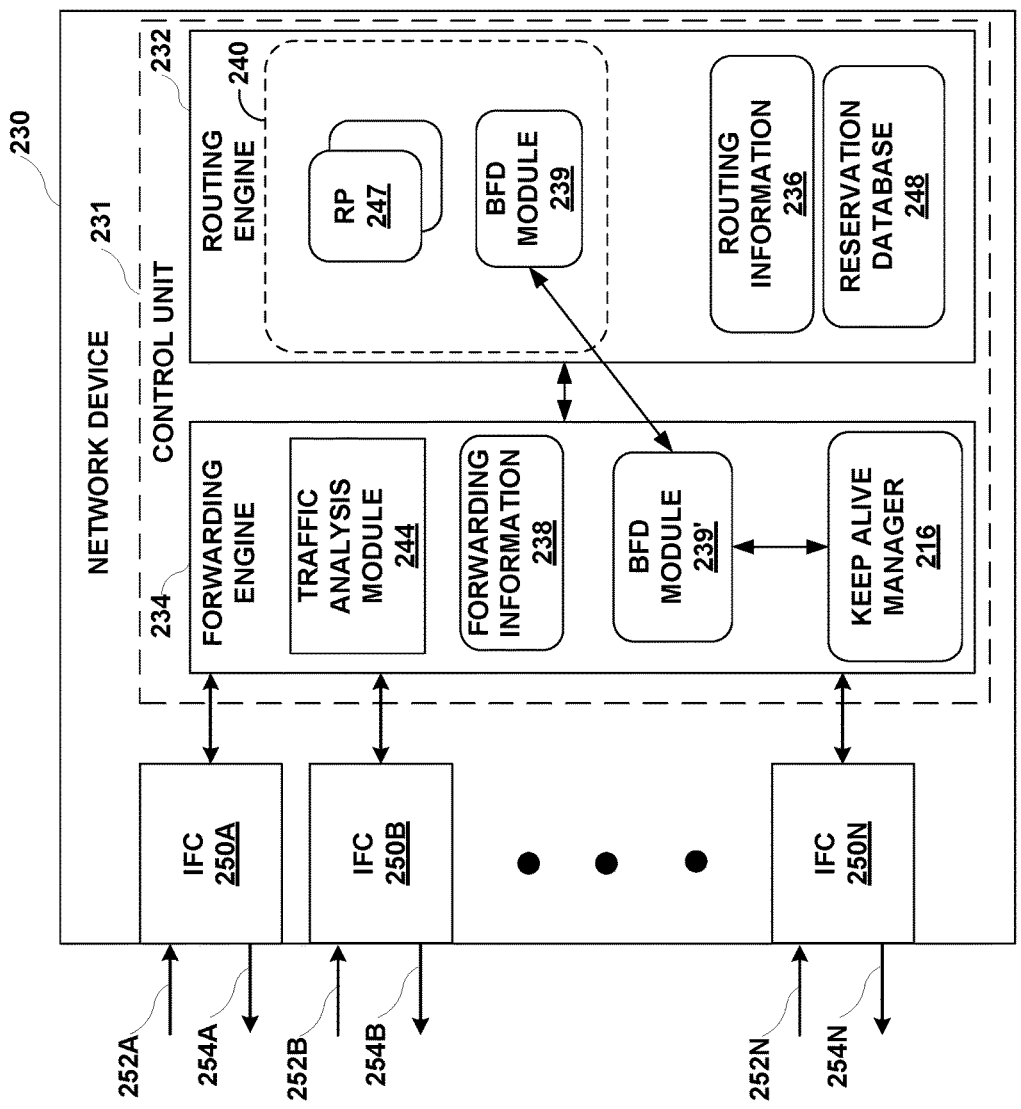
FIG. 4 is a block diagram illustrating an exemplary router in accordance with the disclosure herein.

FIG. 4 is a block diagram illustrating an exemplary router 230 in accordance with the disclosure herein. Router 230 is one example implementation of any of network devices 12 illustrated in FIGS. 1-3. While router 230 illustrates one possible router implementation to perform the techniques described herein, it will be appreciated that various other implementations are possible in accordance with this disclosure.

In this example, router 230 includes a control unit 231 that comprises a routing engine 232 and a forwarding engine 234. In addition, router 230 includes a set of interface cards (IFCs) 250A-250N (collectively, "IFCs 250") for communicating packets via inbound links 252A-252N (collectively, "inbound links 252") and outbound links 254A-254N (collectively, "outbound links 254").

Routing engine 232 primarily provides an operating environment for control plane protocols, such as those included in protocols 240. For example, one or more routing protocols ("RPs") 247 that maintain routing information 236 to reflect the current topology of a network and other network entities to which it is connected. In particular, each RP 247 updates routing information 236 to accurately reflect the topology of the network and other entities. Example routing protocols include Multi-Protocol Border Gateway Protocol (mpBGP), the Intermediate System to Intermediate System (ISIS) routing protocol, the Open Shortest Path First (OSPF) routing protocol and the like.

Routing engine 232 generates and programs forwarding engine 234 with forwarding information 238 that associates network destinations with specific next hops and corresponding interface ports of IFCs 250 in accordance with routing information 236. Routing engine 232 may generate forwarding information 238 in the form of a radix tree having leaf nodes that represent destinations within the network.

Based on forwarding information 238, forwarding engine 234 forwards packets received from inbound links 252 to outbound links 254 that correspond to next hops associated with destinations of the packets. U.S. Pat. No. 7,184,437 provides details on an exemplary embodiment of a router that utilizes a radix tree for route resolution, the contents of which is incorporated herein by reference in its entirety.

In one example, forwarding engine 234 is a rich and dynamic shared forwarding plane, optionally distributed over a multi-chassis router. Moreover, forwarding plane 234 may be provided by dedicated forwarding integrated circuits normally associated with high-end routing components of a network router. Further details of one example embodiment of router 230 can be found in U.S. Provisional Patent Application 61/054,692, filed May 20, 2008, entitled "STREAMLINED PACKET FORWARDING USING DYNAMIC FILTERS FOR ROUTING AND SECURITY IN A SHARED FORWARDING PLANE," which is incorporated herein by reference.

Moreover, as shown in FIG. 4, protocols 240 include BFD module 239 that is enhanced in accordance with the techniques described herein. For example, BFD module 239, in conjunction with other components of router 230, is configured to avoid potential false alarms as described herein. BFD module 239 of routing engine 232 may program BFD module 239' in forwarding engine 234 or similar logic (not shown) in any of IFCs 50 that utilize BFD protocol-based logic to monitor incoming BFD packets and report a failed connection with another router to routing engine 239. BFD module 239 may, for example, program BFD module 239' with configuration information that specifies TOS/QOS settings and host-level preferential indicator that escalate for keep-alive probe packets sent later within a detection interval of the acknowledging device, such as the example shown in Table 1. The configuration information may be received from an administrator, e.g., by a device management session, or from the peer network device during session negotiation.

BFD module 239' implements BFD protocol-based functionalities, such as transmitting and monitoring for periodic BFD packets received by forwarding engine 234, thereby conserving resources that would otherwise be expended by routing engine 232. In case of a detected connectivity failure, BFD module 239' is configured to transmit a failure notification, or other similar indication, to BFD module 239 of routing engine 232. In response to receiving the failure notification from BFD module 239' of forwarding engine 234, BFD module 239 causes RP 247 to update the network topology currently stored to routing information 236, to reflect the failed link(s) represented by the BFD failure.

As shown in FIG. 4, forwarding engine 234 includes keep-alive manager 216, which is communicatively coupled to BFD module 239'. While shown separately from BFD module 239' for purposes of clarity, in various examples, keep-alive manager 216 may be included in BFD 239', or may be implemented in other components of router 230.

In general, keep-alive manager 216 operates as described herein, such as with respect to keep alive manager 116, to reduce avoidance of triggering false alarms with respect to BFD protocol implemented by BFD module 239'. That is, keep-alive manager 216 provides keep-alive functionality for each BFD session instantiated by BFD module 239'. For example, for each communication session, keep alive manager 216 instantiates a transmit timer and a detection timer, for triggering transmission of BFD keep alive messages and, if required, BFD keep alive response messages, respectively, for the corresponding BFD session. Although not shown in FIG. 4, keep-alive manager 216 may include a keep-alive transmit controller and a keep-alive receive controller that operate responsive to internal timers as described with respect to keep-alive TX controller 118 and keep-alive RCV controller 120 in accordance with the techniques described herein. As such, keep-alive manager 216 may generate BFD keep-alive packets at a time later in the detection interval for the respective BFD session to include increased QOS/TOS priority and, therefore, receive preferential treatment by intermediate network elements. In addition, for BFD keep-alive packets that are sent later in the detection interval, keep-alive manager 216 may insert host-level preferential indicator within each of the packets to request preferential treatment by endpoint network devices. In this way, the techniques described herein may help ensure timely delivery of BFD keep-alive packets when expiration of the detection interval is approaching, thereby avoiding false alarms due to network congestion. Moreover, when constructing BFD keep-alive packets, keep alive manager 216 may set the QOS/TOS settings and host-level preferential indicator within the packet header to be the same as the QOS/TOS settings and host-level preferential indicator within the packet header of the most-recently received BFD keep-alive packet. As such, in the event a BFD keep-alive probe packet is received having escalated priority and host-level preferential indicator, thereby receiving priorities processing and avoiding network congestion within intermediate network elements and/or host network devices, the BFD keep-alive packets sent in response thereto will automatically have the same escalated priorities and host-level preferential indicator.

The architecture of router 230 illustrated in FIG. 4 is shown for exemplary purposes only. In other implementations, router 230 may be configured in a variety of ways. In one example, control unit 231 and its corresponding functionality may be distributed within IFCs 250. Control unit 231 may be implemented solely in software, or hardware, or may be implemented as a combination of software, hardware, or firmware. For example, control unit 231 may include one or more processors which execute software instructions. In that case, the various software modules of control unit 231, such as protocols 240, may comprise executable instructions stored on a computer-readable medium, such as one or more of computer memory, computer readable-storage devices (e.g., hard disks and/or solid-state disks), or non-transitory computer-readable media.

Figure 5:
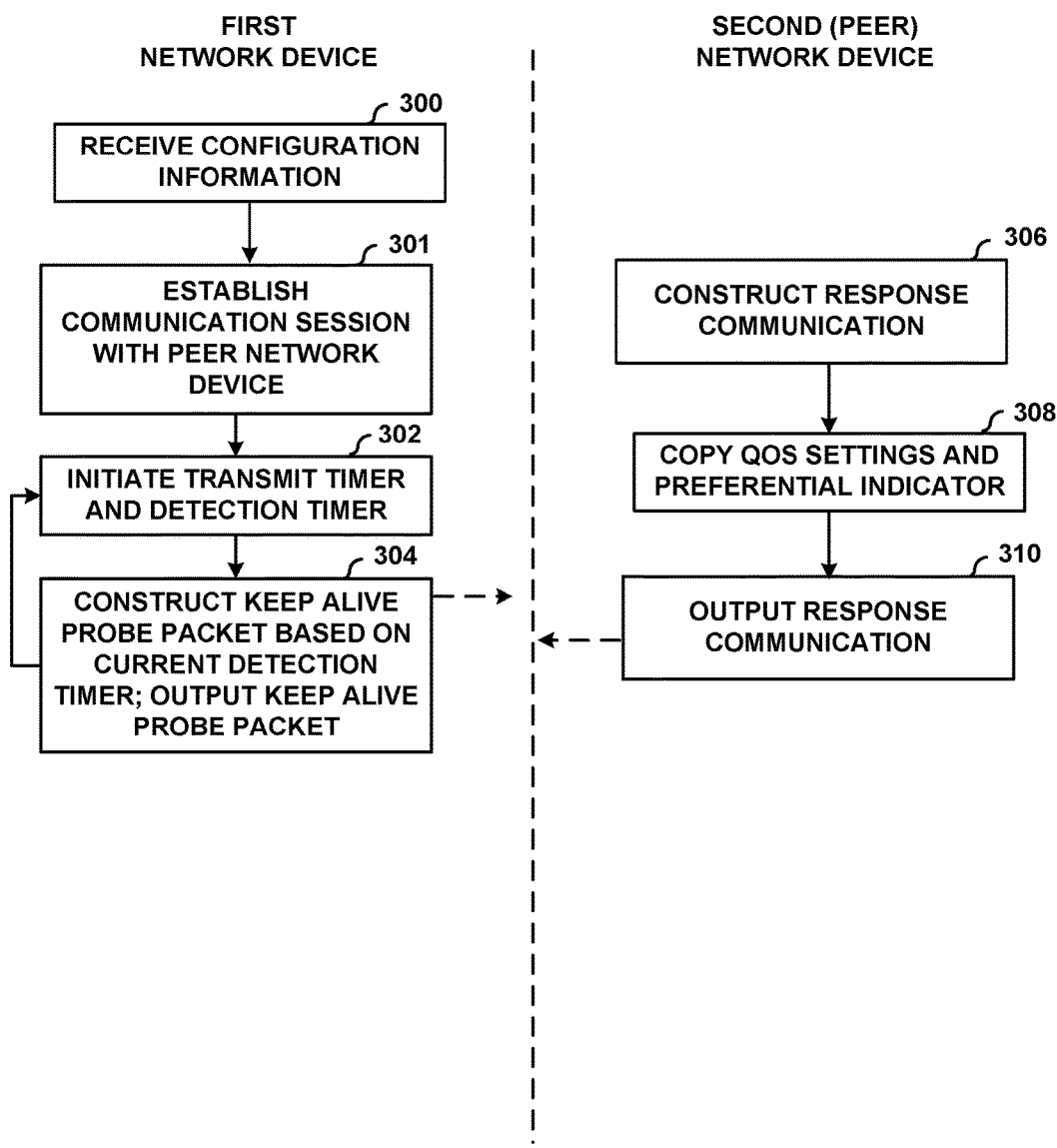
FIG. 5 is a flowchart illustrating example processes by which network devices participating in keep-alive messaging schemes operate in accordance with one or more aspects of this disclosure.

FIG. 5 is a flowchart illustrating example processes by which network devices participating in keep-alive messaging schemes operate in accordance with one or more aspects of this disclosure. In the example of FIG. 5, the techniques are described with respect to a first network device and a second (peer) network device. The network devices of FIG. 5 may, for example, represent any of network devices 12A, 12B of FIGS. 1-2, network device 100 of FIG. 3 or network router 200 of FIG. 4.

Initially, the first network device receives configuration information (300) and establishes a communication session, such as a BFD session, with the peer network device (301). For instance, the first network device may receive configuration information that specifies TOS/QOS settings and host-level preferential indicator that escalate for keep-alive probe packets sent later within a detection interval of the acknowledging device, such as the example shown in Table 1. The configuration information may be received from an administrator, e.g., by a device management session, or from the peer network device.

Upon establishing the network session with the peer network device, the first network device initiates a transmit timer for the session (302) and, responsive to expiration of the transmit timer, constructs and outputs keep-alive probe packets (304). As described herein, in order to potentially avoid false alarms, the transmitting network device adjusts quality of service (QOS)/type of service (TOS) settings and any host-level preferential indicators in the keep-alive probe packets that are sent later in the detection interval so as to have escalating priorities. That is, when constructing a given keep-alive probe packet, the network device determines whether a communication (e.g., a keep-alive response packet or a keep-alive probe packet) has been received from the peer network device since the last keep-alive probe packet transmitted by the network device. When a communication has not been received the network device constructs and outputs the keep-alive probe packet and sets the QoS settings based on the configuration data so as to have increased priority. Moreover, when the communication from the peer network device has not been received, the network device sets the host-level preferential indicator of the keep-alive probe packet to have a value indicating that preferential treatment is requested.

The peer network device constructs a response communication (306). As one example, the peer network device may construct a keep-alive response packet in response to receiving the keep-alive probe packet. As another example, the peer network device may construct its own keep-alive probe packet upon expiration of a respective transmit timer. In any event, the peer network device copies the QoS settings and any host-level preferential indicator of the first keep-alive probe packet to QoS settings and host-level preferential indicator of the response communication (308). Once constructed, the peer network device outputs the response communication to the first network device (310). The peer network device may output the response communication on the same network session on which the keep-alive probe packet was received. For example, the peer network device may construct and output the response communication as a keep-alive response packet and output the keep-alive response packet on the same communication session. Alternatively, the peer network device may output the response communication to the first network device on a different communication session. For example, the peer network device may construct the response communication as a keep-alive probe packet (e.g., asynchronous BFD probe packet) and output the keep-alive probe packet on a separate communications session different from the communication session on which the keep-alive probe packet was received from the first network device.

The techniques described in this disclosure may be implemented in hardware or any combination of hardware and software (including firmware). Any features described as units, modules, or components may be implemented together in an integrated logic device or separately as discrete but interoperable logic devices. If implemented in hardware, the techniques may be realized in a processor, a circuit, a collection of logic elements, or any other apparatus that performs the techniques described herein. If implemented in software, the techniques may be realized at least in part by a non-transitory computer-readable storage medium or computer-readable storage device encoded with, having stored thereon, or otherwise comprising instructions that, when executed, cause one or more processors, such as programmable processor(s), to perform one or more of the methods described above. The non-transitory computer-readable medium may form part of a computer program product, which may include packaging materials. The non-transitory computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein, may refer to any of the foregoing structures or any other structure suitable for implementation of the techniques described herein. Likewise, the term "control unit," as used herein, may refer to any of the foregoing structures or any other structure suitable for implementation of the techniques described herein. In addition, in some aspects, the functionality described herein may be provided within dedicated software and hardware units configured to perform the techniques of this disclosure. Depiction of different features as units is intended to highlight different functional aspects of the devices illustrated and does not necessarily imply that such units must be realized by separate hardware or software components. Rather, functionality associated with one or more units may be integrated within common or separate hardware or software components.

Various examples have been described. These and other examples are within the scope of the following claims.

What is claimed is:

1. A method comprising:

maintaining, with a network device, a keep-alive transmit timer and a keep-alive detection timer associated with a communication session with a peer network device within a network, wherein the keep-alive transmit timer defines a transmit time interval for transmitting keep-alive probe packets for the communication session and the keep-alive detection timer defines a current detection interval within which a response communication from the peer network device must be received to avoid a failure event for the communication session;

responsive to expiration of the keep-alive transit timer during the current detection interval, outputting, by the network device, a first keep-alive probe packet associated with the communication session with the peer network device, wherein the first keep-alive probe packet includes quality of service (QoS) settings that control forwarding priority of the keep-alive probe packet by packet-switching devices within the network, and wherein the QoS settings have a value indicating a first priority level; and responsive to a second expiration of the keep-alive transit timer associated with the current detection interval, determining, by the network device, whether a communication has been received from the peer network device since output of the first keep-alive probe packet and, when the communication has not been received, outputting a second keep-alive probe packet associated with the communication session, wherein the second keep-alive probe packet includes QoS settings having a value indicating a second priority level increased from the first priority level.

2. The method of claim 1,
wherein the first keep-alive probe packet and the second keep-alive probe packet each includes a host-level preferential indicator separate from the QoS settings that specifies preferential treatment for the first keep-alive probe packet by packet processing software or hardware on the network device when outputting the first keep-alive probe packet and by packet processing software or hardware on the peer network device when receiving the first keep-alive probe packet,
wherein the network device sets the host-level preferential indicator of the first keep-alive probe packet to have a first value indicating that preferential treatment is not requested, and
wherein, when the communication from the peer network device has not been received, the network device sets the host-level preferential indicator of the second keep-alive probe packet to have a second value indicating that preferential treatment is requested.

3. The method of claim 2, wherein the host-level preferential indicator comprise one of: a flag set within a reserved Transmission Control Protocol (TCP) bit, a flag set within an unused bidirectional forwarding detection (BFD) protocol diagnostic bit, or an unused Internet Protocol (IP) options bit.

4. The method of claim 1, wherein the communication from the peer network device comprises a keep-alive response packet sent by the peer network device to the network device on the communication session.

5. The method of claim 1, wherein the communication from the peer network device comprises a keep-alive probe packet sent by the peer network device to the network device on a second communication session.

6. The method of claim 1,
wherein the communication session comprises a bidirectional forwarding detection (BFD) protocol session between the network device and the peer network device,
wherein the first keep-alive probe packet and the second keep-alive probe packets output by the network device comprises BFD keep-alive probe packets, and
wherein the communication from the peer network device comprises a BFD keep-alive probe packet sent by the peer network device to the network device on a second communication session.

7. The method of claim 1,
further comprising: receiving, by the peer network device, the first keep-alive probe packet;
constructing, with the peer network device, a keep-alive response packet, wherein constructing the keep-alive response packet includes copying the QoS settings of the first keep-alive probe packet to QoS settings within the keep-alive response packet; and
outputting the keep-alive response packet from the peer device to the network device.

8. The method of claim of claim 7,
wherein the first keep-alive probe packet includes a host-level preferential indicator that specifies preferential treatment for the first keep-alive probe packet by packet processing software or hardware on the network device when outputting the first keep-alive probe packet and by packet processing software or hardware on the peer network device when receiving the first keep-alive probe packet, and
wherein constructing the keep-alive response packet with the peer network device includes copying the host-level preferential indicator of the first keep-alive probe packet received from the network device to a host-level preferential indicator within the keep-alive response packet.

9. A method comprising:
receiving, by a network device, a keep-alive probe packet associated with a communication session with a peer network device within a network, wherein the keep-alive probe packet includes quality of service (QoS) settings that controls forwarding priority of the keep-alive probe packet by packet-switching devices within the network;
constructing, with the network device, a keep-alive response packet, wherein constructing the keep-alive response packet includes copying the QoS settings of the keep-alive probe packet to QoS settings within the keep-alive response packet; and outputting the keep-alive response packet from the network device to the peer network device;
wherein the keep-alive probe packet includes a host-level preferential indicator that specifies preferential treatment for the keep-alive probe packet by packet processing software or hardware on the network device when receiving the keep-alive probe packet and by packet processing software or hardware on the peer network device when transmitting the keep-alive probe packet, and
wherein constructing the keep-alive response packet with the network device includes copying the host-level preferential indicator of the keep-alive probe packet received from the network device to a host-level preferential indicator within the keep-alive response packet.

10. A network device comprising:
one or more programmable processors coupled to a memory storing instructions and at least one network interface; and
wherein, when executing the instructions, the processor is configured to:
maintain a keep-alive transmit timer and a keep-alive detection timer associated with a communication session with a peer network device within a network, wherein keep-alive transmit timer defines a transmit time interval for transmitting keep-alive probe packets for the communication session and the keep-alive detection timer defines a current detection interval within which a response communication from the peer network device must be received to avoid a failure event for the communication session;

responsive to expiration of the keep-alive transit timer during the current detection interval, output a first keep-alive probe packet associated with the communication session with the peer network device, wherein the first keep-alive probe packet includes quality of service (QoS) settings that control forwarding priority of the keep-alive probe packet by packet-switching devices within the network, and wherein the QoS settings have a value indicating a first priority level; responsive to a second expiration of the keep-alive transit timer associated with the current detection interval, determine whether a communication has been received from the peer network device since output of the first keep-alive probe packet and, when the communication has not been received, output a second keep-alive probe packet associated with the communication session, wherein the second keep-alive probe packet includes QoS settings having a value indicating a second priority level increased from the first priority level.

11. The network device of claim 10,
wherein the first keep-alive probe packet and the second keep-alive probe packet each includes a host-level preferential indicator separate from the QoS settings that specifies preferential treatment for the first keep-alive probe packet by packet processing software or hardware on the network device when outputting the first keep-alive probe packet and by packet processing software or hardware on the peer network device when receiving the first keep-alive probe packet,
wherein the network device sets the host-level preferential indicator of the first keep-alive probe packet to have a first value indicating that preferential treatment is not requested, and
wherein, when the communication from the peer network device has not been received, the network device sets the host-level preferential indicator of the second keep-alive probe packet to have a second value indicating that preferential treatment is requested.

12. The network device of claim 11, wherein the host-level preferential indicator comprise one of: a flag set within a reserved Transmission Control Protocol (TCP) bit, a flag set within an unused bidirectional forwarding detection (BFD) protocol diagnostic bit, or an unused Internet Protocol (IP) options bit.

13. The network device of claim 10, wherein the communication from the peer network device comprises a keep-alive response packet sent by the peer network device to the network device on the communication session.

14. The network device of claim 10, wherein the communication from the peer network device comprises a keep-alive probe packet sent by the peer network device to the network device on a second communication session.

15. The network device of claim 10,
wherein the communication session comprises a bidirectional forwarding detection (BFD) protocol session between the network device and the peer network device,
wherein the first keep-alive probe packet and the second keep-alive probe packets output by the network device comprises BFD keep-alive probe packets, and
wherein the communication from the peer network device comprises a BFD keep-alive probe packet sent by the peer network device to the network device on a second communication session.

16. A network device comprising:
one or more programmable processors coupled to a memory storing instructions and at least one network interface; and
wherein, when executing the instructions, the processor is configured to: receive, by a network device, a keep-alive probe packet associated with a communication session with a peer network device within a network, wherein the keep-alive probe packet includes quality of service (QoS) settings that controls forwarding priority of the keep-alive probe packet by packet-switching devices within the network;
construct, with the network device, a keep-alive response packet, wherein constructing the keep-alive response packet includes copying the QoS settings of the keep-alive probe packet to QoS settings within the keep-alive response packet; and
output the keep-alive response packet from the network device to the peer network device;
wherein the keep-alive probe packet includes a host-level preferential indicator that specifies preferential treatment for the keep-alive probe packet by packet processing software or hardware on the network device when receiving the keep-alive probe packet and by packet processing software or hardware on the peer network device when transmitting the keep-alive probe packet, and
wherein constructing the keep-alive response packet with the network device includes copying the host-level preferential indicator of the keep-alive probe packet received from the network device to a host-level preferential indicator within the keep-alive response packet.

* * * * *

UNITED STATES PATENT AND TRADEMARK OFFICE
CERTIFICATE OF CORRECTION

PATENT NO. : 10,374,936 B2
APPLICATION NO. : 14/984926
DATED : August 6, 2019
INVENTOR(S) : Prashant Singh and Sairam Neelam Page 1 of 1

It is certified that error appears in the above-identified patent and that said Letters Patent is hereby corrected as shown below:

In the Claims

Column 16, Line 8 (Claim 8) Replace "of claim of claim" with --of claim--

Signed and Sealed this
Nineteenth Day of May, 2020

Andrei Iancu
*Director of the United States Patent and Trademark Office*